United States Patent
Stamm et al.

(10) Patent No.: US 7,267,015 B2
(45) Date of Patent: Sep. 11, 2007

(54) SYSTEM AND METHOD FOR TESTING MEDIA DEVICE DOORS

(75) Inventors: Stephen J. Stamm, Ft. Lupton, CO (US); William E. Faulkner, Broomfield, CO (US); Gregory P. Argys, Westminster, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/945,717

(22) Filed: Sep. 20, 2004

(65) Prior Publication Data

US 2006/0060002 A1    Mar. 23, 2006

(51) Int. Cl.
*G01L 3/00*    (2006.01)

(52) U.S. Cl. .................................. 73/862.08

(58) Field of Classification Search ............. 73/862.08
See application file for complete search history.

(56) References Cited

U.S. PATENT DOCUMENTS

| | | | |
|---|---|---|---|
| 2,741,118 A | 4/1956 | Ricciardi | |
| 3,648,326 A | 3/1972 | Gaysowski | |
| 3,688,567 A | 9/1972 | Thorwest et al. | |
| 3,955,661 A | 5/1976 | Popper et al. | |
| 4,023,404 A | 5/1977 | Brendel | |
| 4,131,830 A | 12/1978 | Lee et al. | |
| 4,539,852 A | 9/1985 | Feld | |
| 4,549,438 A | 10/1985 | Grabovac et al. | |
| 4,556,923 A | 12/1985 | Olmsted | |
| 4,644,269 A | 2/1987 | Golder et al. | |
| 4,716,772 A | 1/1988 | Bubeck et al. | |
| 4,794,801 A | 1/1989 | Andrews et al. | |
| 4,811,850 A | 3/1989 | Bankuty et al. | |
| 4,816,851 A | 3/1989 | Fujahori et al. | |
| 4,842,120 A | 6/1989 | Dobbins et al. | |
| 4,850,230 A | 7/1989 | Eldridge | |
| 5,138,512 A | 8/1992 | Hayashi | |
| 5,172,616 A | 12/1992 | Negishi | |
| 5,218,282 A | 6/1993 | Duhame | |
| 5,451,849 A * | 9/1995 | Porter et al. ................. 318/466 |
| 5,627,767 A * | 5/1997 | Gabiniewicz et al. .......... 702/41 |
| 5,632,120 A | 5/1997 | Shigematsu et al. | |
| 5,742,964 A | 4/1998 | Choi | |
| 5,804,937 A | 9/1998 | Sasajima et al. | |
| 6,065,185 A * | 5/2000 | Breed et al. ................. 16/86 C |
| 6,176,039 B1 | 1/2001 | Craig | |

(Continued)

FOREIGN PATENT DOCUMENTS

EP    0697697 A3    8/1996

(Continued)

OTHER PUBLICATIONS

European Search Report mailed on Feb. 23, 2006, for European Patent Application No. 05 25 5616, filed on Sep. 20, 2004, 4 pages.

*Primary Examiner*—Maxx Noori
(74) *Attorney, Agent, or Firm*—Morrison & Foerster LLP (57) ABSTRACT

A system and method for direct measurement of torque is disclosed herein. The system includes a torque transducer and a contact arm, wherein the torque transducer, contact arm, and pivot point of the device being measured are positioned along a rotational axis of the pivot point of the device. A cartridge door of a tape cartridge may be measured.

22 Claims, 5 Drawing Sheets

U.S. PATENT DOCUMENTS

| | | | |
|---|---|---|---|
| 6,181,515 B1 | 1/2001 | Taguchi | |
| 6,305,573 B1 * | 10/2001 | Fritze et al. | 222/58 |
| 6,591,162 B1 | 7/2003 | Martin | |
| 6,595,075 B1 | 7/2003 | Shien et al. | |
| 6,637,494 B1 * | 10/2003 | Nabeta | 160/206 |
| 2002/0066734 A1 * | 6/2002 | Harris | 220/304 |

FOREIGN PATENT DOCUMENTS

| | | |
|---|---|---|
| EP | 0985573 A2 | 3/2000 |
| EP | 0697697 B1 | 5/2001 |
| EP | 1106970 A2 | 6/2001 |
| EP | 1205620 A1 | 5/2002 |
| EP | 1049850 B1 | 6/2003 |
| GB | 2122760 | 1/1984 |
| JP | 61009239 | 7/1987 |
| JP | 61163294 | 1/1988 |
| JP | 62151780 | 1/1988 |
| JP | 61170873 | 2/1988 |
| JP | 02110540 | 1/1992 |
| JP | 4109487 | 4/1992 |
| JP | 05260408 | 4/1995 |
| JP | 10198870 | 7/1998 |
| JP | 11007683 | 1/1999 |
| JP | 11052522 | 2/1999 |
| JP | 11053865 | 2/1999 |
| JP | 2000041898 | 2/2000 |
| JP | 2001223481 | 8/2001 |
| JP | 2005124800 | 5/2005 |
| WO | 00/75471 A1 | 12/2000 |
| WO | 01/14678 A1 | 3/2001 |

* cited by examiner

SYSTEM AND METHOD FOR TESTING MEDIA DEVICE DOORS

BACKGROUND OF THE INVENTION

The present invention relates to media devices. More particularly, the present invention relates to torque measurement of media devices.

The force required to rotate one component about an axis is relevant in a number of industries. For example, precision shaft bearings for aircraft subassemblies, electric air motors, hydraulic and pneumatic pumps, and magnetic tape and disk drives include one or more components requiring torque resistance to be within a predetermined limit. For this reason, test equipment including a torque measurement device, such as a torque gauge or transducer, is employed to measure one component during its rotational movement relative to another component.

Presently, tape cartridges (or tape cassettes or media devices) can include a door to access the magnetic tape within. The tape cartridge door is opened and closed by rotation about a fixed pivot point. The force applied to open and/or close a tape cartridge door should be within a certain range. Excessive force may damage the door or nearby components of the tape cartridge or tape drive. Too little force may be insufficient to close the door.

Figure 1:
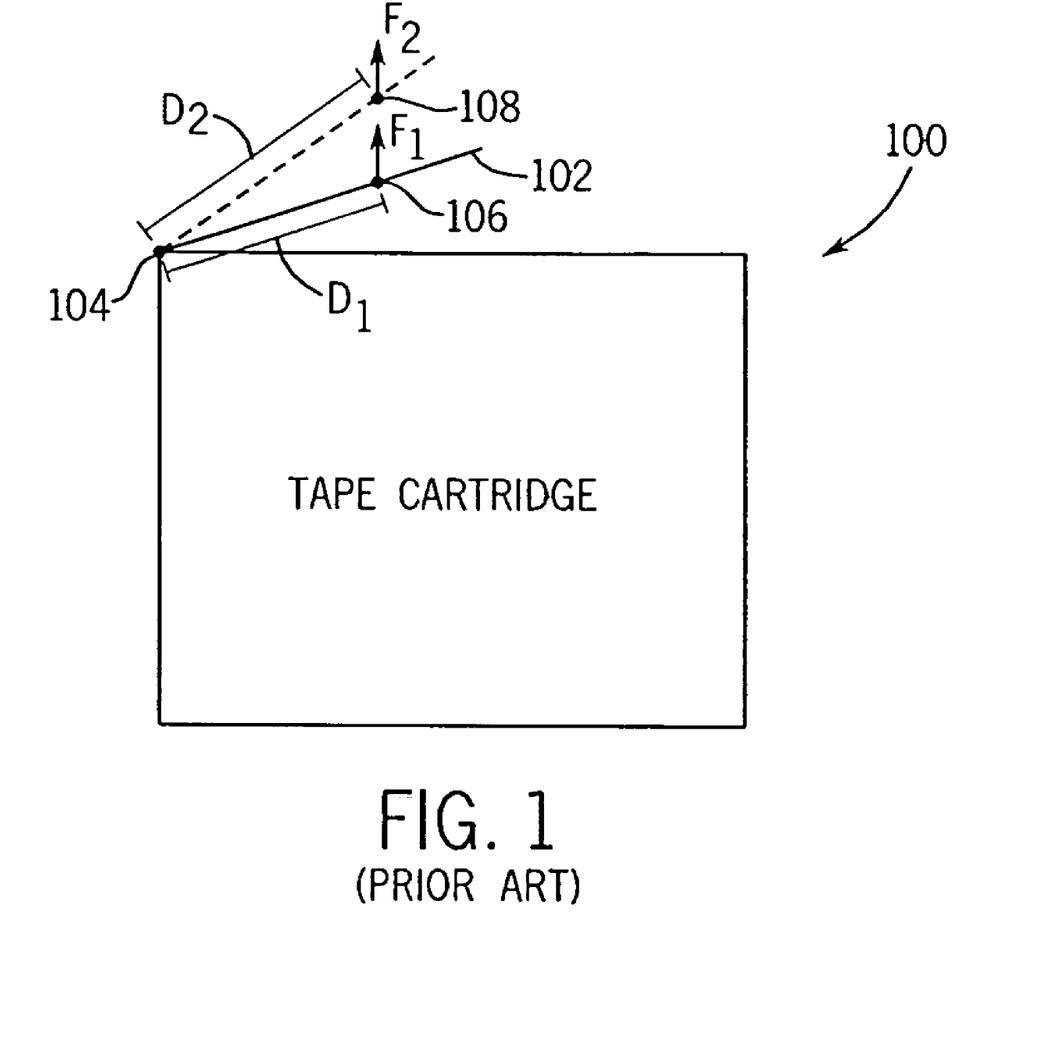
FIG. 1 is a block diagram of a tape cartridge showing forces associated with open door positions.

The force required to operate the cartridge door can be tested using pull-testing equipment. The pull-testing equipment pulls the cartridge door open while measuring forces over a range of door rotation. In FIG. 1, there is shown a tape cartridge 100 during force measurement. A cartridge door 102 of the tape cartridge 100 is pulled open about a door hinge pivot point 104. A pulling mechanism of the pull-testing equipment contacts the door 102 and applies a vertical upward force to pull open the door 102.

In order to continuously apply the vertical upward force, the pulling mechanism moves along the door 102 in a direction away from the door hinge pivot point 104 as the rotation angle of the door increases. Hence, for each rotation angle, the force is measured at a different distance from the door hinge pivot point 104. For example, when the pulling mechanism is in contact with the door 102 at a point 106, the distance between the point 106 and the door hinge pivot point 104 is $D_1$ and the force measured is $F_1$. When the pulling mechanism is in contact with the door 102 at a point 108, the distance is $D_2$ and the measured force is $F_2$. The distances $D_1$ and $D_2$ are not equal to each other.

The measured distances and forces, which change simultaneously for each rotation angle, must then be converted or interpreted into a format that is usable as torque measurements. The measured forces, for example, may need to be provided in a graphical form to take into account the different distances or the vector force components.

Thus, it would be beneficial to obtain direct outputs of torque measurements during media device door testing. Moreover, a testing system that permits automatic or semi-automatic testing and direct measurements of a plurality of tape cartridges, media devices, and/or one or more open door positions for each tape cartridge would be beneficial.

BRIEF DESCRIPTION OF THE OF THE DRAWINGS

The exemplary embodiment will become more fully understood from the following detailed description, taken in conjunction with the accompanying drawings, wherein like reference numerals denote like elements, in which.

In the drawings, to easily identify the discussion of any particular element or part, the most significant digit or digits in a reference number refer to the figure number in which that element is first introduced (e.g., element 1104 is first introduced and discussed with respect to FIG. 11).

The headings provided herein are for convenience only and do not necessarily affect the scope or meaning of the claimed invention.

DETAILED DESCRIPTION OF THE INVENTION

Described in detail below is a system and method for testing a pivoting door of a media device. The amount of torque required to open, for example, a tape cartridge door at one or more angles relative to the reference door position is measured. The torque testing system can utilize conventional torque transducers while providing torque measurements that do not require conversion to be in usable format.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Figure 2:
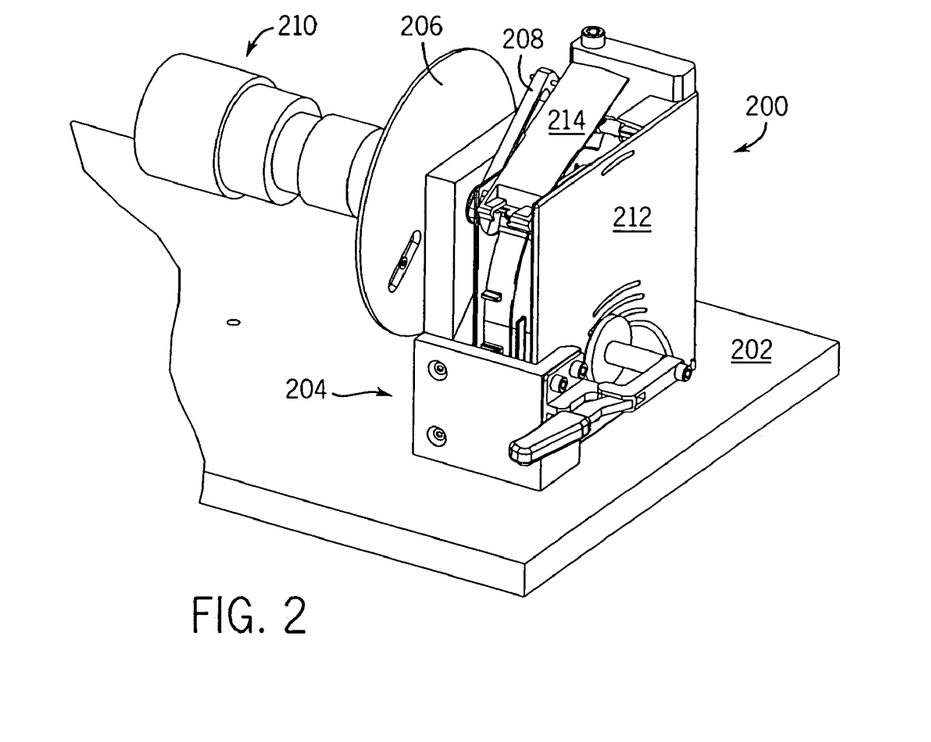
FIG. 2 is a perspective view of a torque measurement and testing system.
Figure 3:
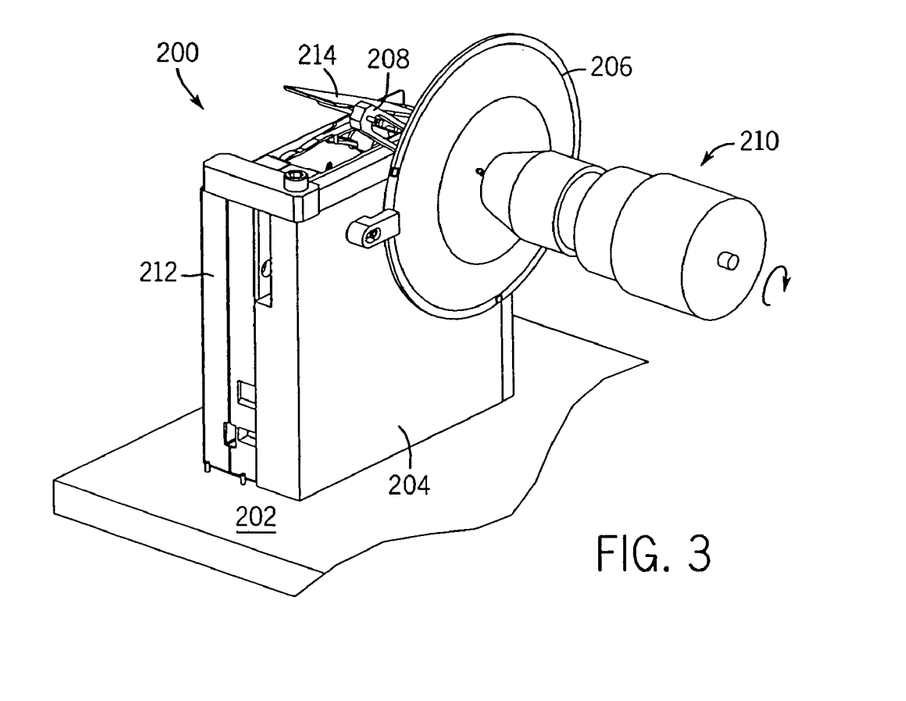
FIG. 3 is another perspective view of the torque measurement and testing system of FIG. 2.

Referring to FIGS. 2 and 3, one embodiment of a torque testing and measurement system 200 is shown. The torque testing system 200 includes a base 202, a tape cartridge holder 204, an interface 206, a door operating lever 208, and a torque gauge 210. The torque testing system 200 is configured to provide direct measurements of torque at one or more open positions of a tape cartridge door 214 of a tape cartridge 212.

The tape cartridge holder 204 is coupled to the top of base 202 to position and maintain the housing of the tape cartridge 212 stationary during the test. For example, holder 204 can comprise an "L" shaped configuration against which the tape cartridge 212 abuts.

The interface 206 is coupled to each of the door operating lever 208 and the torque gauge 210. The interface 206 is configured to couple with the door operating lever 208 such that a pivot point of the door operating lever 208 is along the centerline (or rotating axis) of a pivot point of the tape cartridge door 214. The interface 206 is further configured to couple the torque gauge 210 about the centerline of the pivot point of the tape cartridge door 214. The interface 206, lever 208, and torque gauge 210 rotate in unison about the rotating axis of the pivot point of the tape cartridge door 214.

For example, the interface 206 can be provided between the door operating lever 208 and the torque gauge 210. The interface 206 can include a connector or adaptive assembly for coupling the torque gauge 210. The interface 206 is rotationally coupled to the cartridge holder 204 and/or the base 202. The interface 208 may be a circular disk shape with the lever 208 provided on one side and the gauge 210 provided on the other side.

The door operating lever or assembly 208 is configured to contact the tape cartridge door 214 at at least one known constant distance from the pivot point of the door 214. The door operating lever 208 is further configured to open and close the door 214 in response to inputs from an operator. The door operating lever 208 may be a variety of shapes, sizes, and/or contact the door 214 at more than one point. For example, the door operating lever 208 can comprise a rotation bar coupled at one end to the interface 206, and connected at the other end to a contact pin (or contact device). The contact pin contacts the tape cartridge door 214 and determines the fixed distance from the door pivot point to the door opening force. The door operating lever will be discussed in greater detail below.

The torque gauge 210 may be a mechanical torque gauge. The torque gauge 210 may be a conventional torque sensor and/or transducer. The torque gauge 210 may provide a mechanical or electrical output (e.g., torque measurements). The torque gauge 210 is configured to be rotated by an operator to provide the door opening force, specify the desired door open position, and to obtain a direct torque measurement corresponding to that desired position. The torque gauge 210 may comprise a torque transducer and a torque sensor; alternatively, the torque gauge 210 may comprise a combined torque transducer and sensor.

The interface 206 and the door operating lever 208 may collectively be referred to as a fixture or direct torque measurement assembly. The interface 206, the door operating lever 208, and the torque transducer of the torque gauge 210 may collectively be referred to as an actuator. It is contemplated that the system 200 may include other components and/or be provided in alternative configurations.

For example, the torque gauge 210 may be a different type from that shown in FIGS. 2-3. As another example, the torque gauge 210 may be coupled to the interface 206 differently such that the rotational axis of the gauge 210 is not along the pivot point of the cartridge door 214 (e.g., a gear train).

As another example, the door operating lever 208 may be a sleeve-type assembly that fits along at least a portion of the cartridge door 214, such as an edge of the door 214. The amount of contact between the door operating lever 208 and the door 214 is a contact point or a contact area (e.g., a plurality of contact points).

For the system 200, the operator rotates the torque gauge 210 to open the cartridge door 214 to a desired open position or angle. This actuation, in turn, opens the cartridge door 214, via rotation of the interface 206 and the door operating lever 208. The torque that was applied to open the cartridge door 214 to such desired position is the output of the gauge 210. The torque value is provided directly by the torque gauge 210. This torque value may be read directly from the gauge 210 (when the gauge 210 is a mechanical gauge) or from a screen or display associated with the gauge 210 (when the gauge 210 is an electronic or electromechanical gauge).

Figure 4:
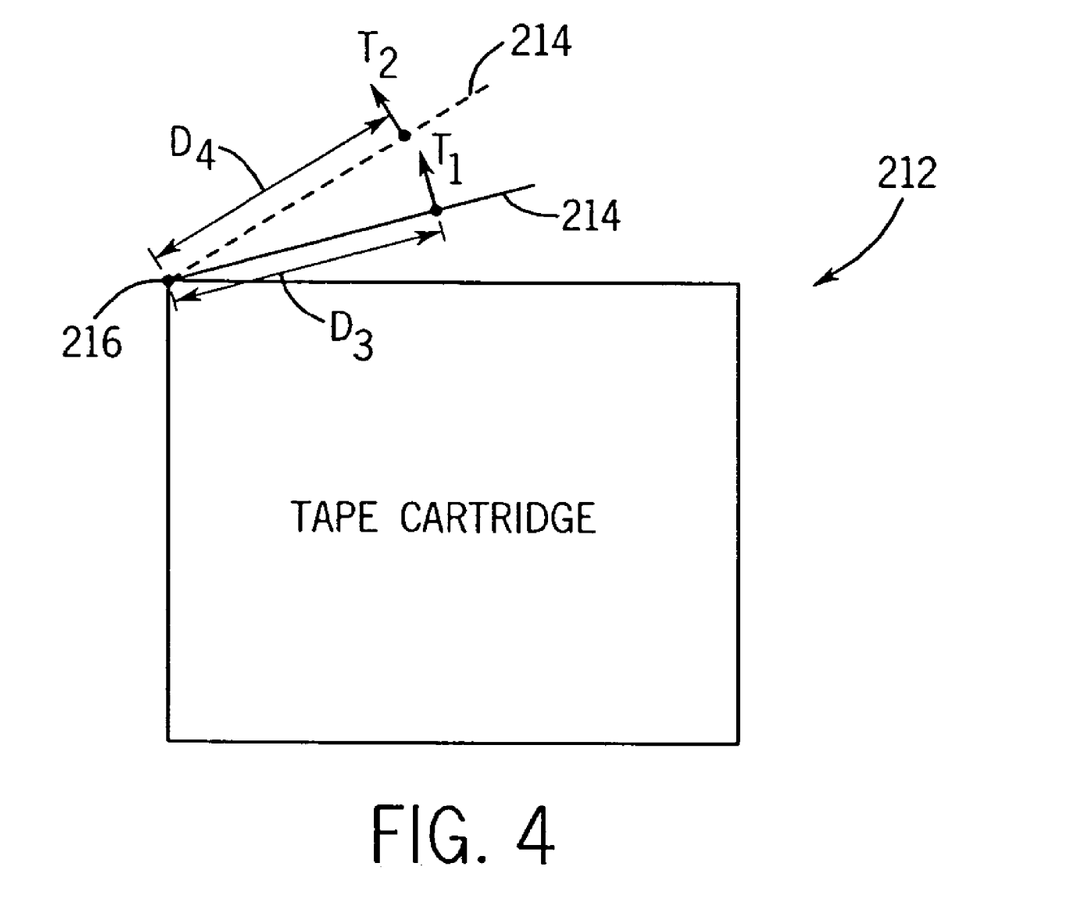
FIG. 4 is a block diagram of a tape cartridge showing torques associated with open door positions.

The system 200 is configured to permit continuous or discrete direct measurements of cartridge door torque relative to a same point of reference, e.g., the door hinge pivot point. Referring to FIG. 4, the tape cartridge 212 includes a door hinge pivot point 216. The amount of torque required to open the cartridge door 214 at one or more specific angles relative to the closed door position (or another reference door angle) is possible using the system 200. Because the force is applied in a direction perpendicular to the major plane (or length) of the cartridge door 214 and applied at the same distance from the pivot point 216 for all door angles, the measurement is the amount of torque. This direct output from the torque gauge 210 eliminates the need for conversion or other transformation of the attained measurements (e.g., providing the force measurements in graphical format to the operator) into a directly usable format.

In FIG. 4, the cartridge door 214 is shown open at two different angles. When the cartridge door 214 is at a first open position, the amount of torque is $T_1$ at a distance $D_3$ from the door hinge pivot point 216. When the cartridge door 214 is at a second open position, the amount of torque is $T_2$ at a distance $D_4$ from the door hinge pivot point 216. The distances $D_3$ and $D_4$ are equal to each other.

As an example, the cartridge door 214 can open in the range of 0° to approximately 115°. It should be understood that although the axis of the pivot point 216 is shown in FIG. 4 at the edge of a side of the cartridge 212, the pivot point 216 may alternatively be along a side or offset from side(s) of the cartridge 212. For example, the pivot point axis may be located approximately 0.5 inches to the right and approximately 0.4 inches below the location of the pivot point 216. The tape cartridge holder 204 can be configured to hold and position various pivot point locations and/or tape cartridge sizes.

Figure 5:
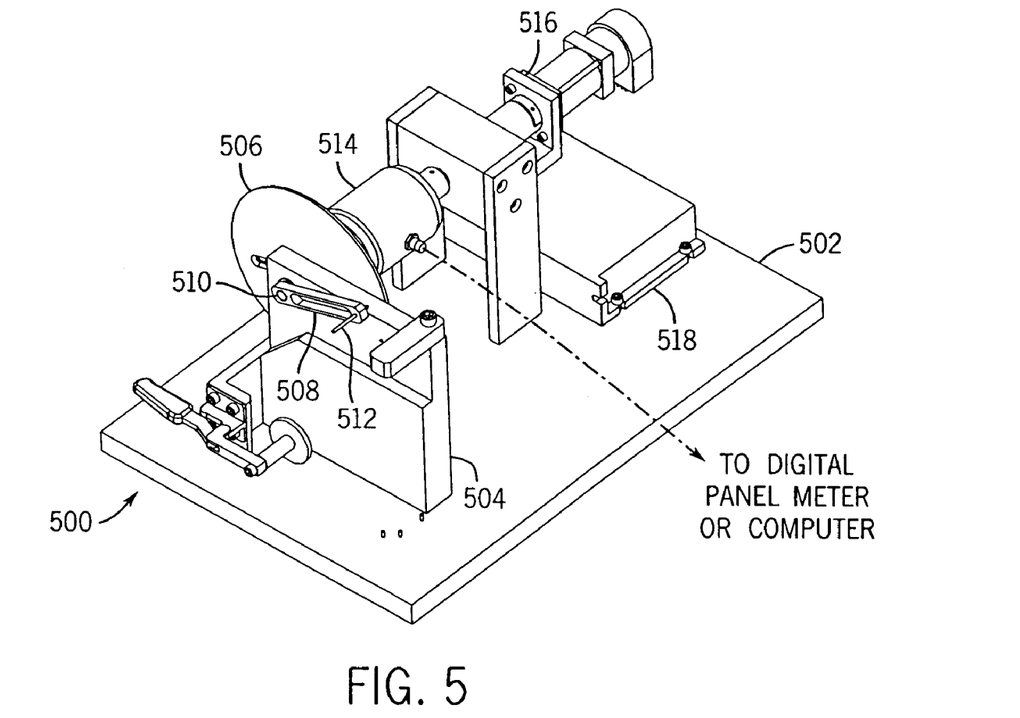
FIG. 5 is a perspective of another embodiment of a torque measurement and testing system.
Figure 6:
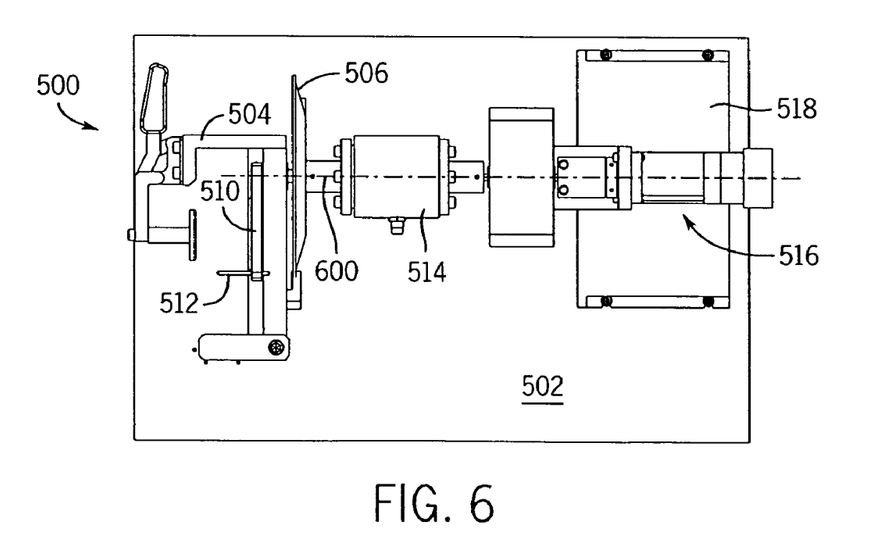
FIG. 6 is a top view of the system of FIG. 5.

Referring to FIGS. 5-6, there is shown another embodiment of a torque testing and measurement system 500. The system 500 includes a base 502, a tape cartridge holder 504, an interface 506, a door operating lever 508, a rotating arm 510, a contact pin 512, a torque sensor apparatus 514, a motor 516, and an amplifier 518. The system 500 is configured to provide direct output of torque measurements similar to the system 200 except that the cartridge door operation or actuation is automated.

The base 502, tape cartridge holder 504, interface 506, and door operating lever 508 are similar to the base 202, tape cartridge holder 204, interface 206, and door operating lever 208, respectively. In FIG. 5, the rotating arm 510 and contact pin 512 comprising the door operating lever 508 are shown in greater detail. One end of the rotating arm 510 is coupled to the interface 506 along the interface's 506 rotational axis (e.g., coaxial). The rotating arm 510 and the interface 506 rotate in unison.

Figure 7:
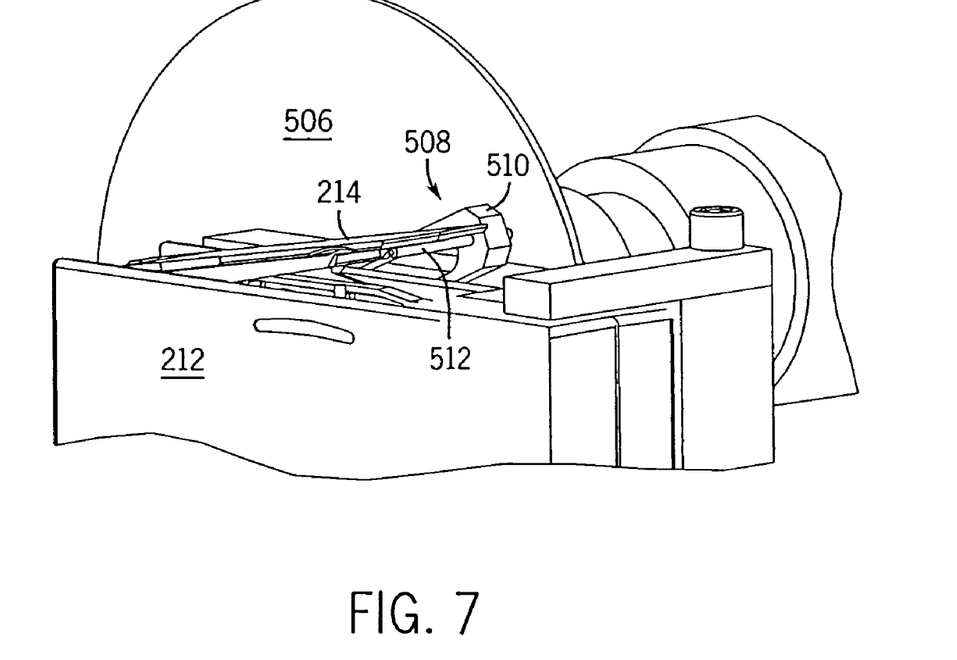
FIG. 7 is a close-up view of a portion of the system of FIG. 2 or 5 with a tape cartridge door in a first open position.
Figure 8:
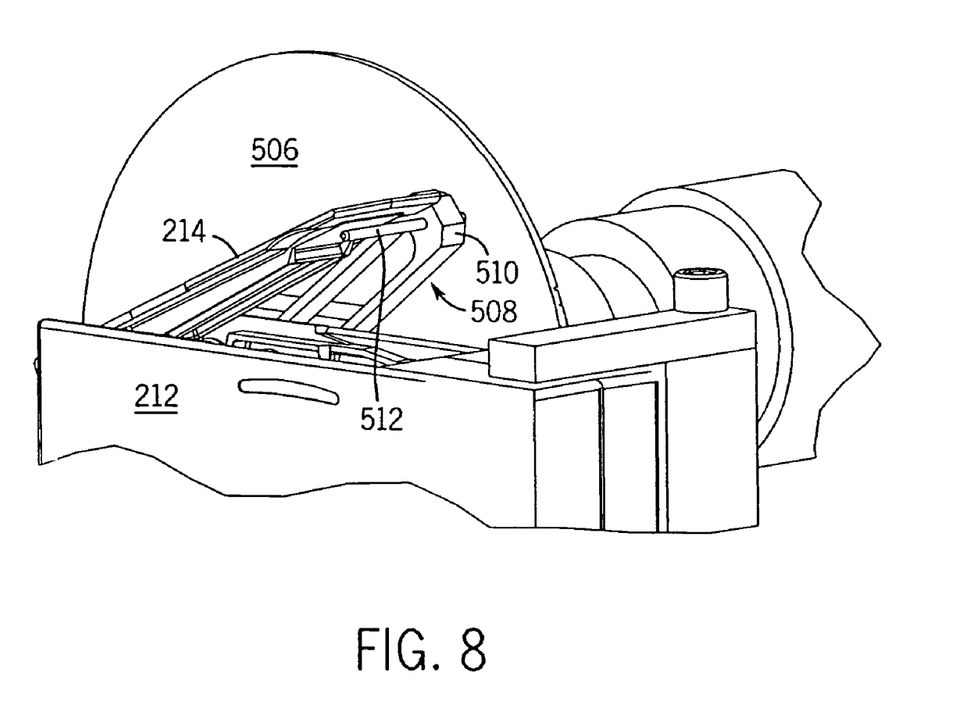
FIG. 8 is a close-up view of a portion of the system of FIG. 2 or 5 with the tape cartridge door in a second open position.

At a fixed distance from the rotational axis of the rotating arm 510, the contact pin 512 is coupled to the rotating arm 510. The contact pin 512 is oriented such that there will be contact with the cartridge door; the force applied by the contact pin 512 to the cartridge door will be in a direction perpendicular to the length of the door 214; and the distance from the rotational axis of the rotating arm 510 to the contact point with the cartridge door is the same for the range of door operation. As an example, the contact pin 512 is configured to contact the inner or underside of the cartridge door. The contact pin 512 lifting or pushing the cartridge door 214 at two different door angles are shown in FIGS. 7-8.

In the system 500, the torque sensor apparatus 514 is rotationally coupled to the interface 506 such that the apparatus 514 senses torque measurements with respect to the rotational axis of the cartridge door and a fixed distance defined by the lever 508. The apparatus 514 includes a torque transducer and a torque sensor. As an example, the apparatus 514 can be a torque sensor manufactured by Transducer Techniques, Inc., of Temecula, Calif. The output of the apparatus 514, e.g., direct torque measurements, is provided to a digital panel meter or computer (not shown) for readout and/or recordation.

The apparatus 514 is coupled between the interface 506 and the motor 516. The motor 516 is also configured along the rotating axis of the cartridge door. The motor 516 can be a servo-motor. As an example, the motor 516 can be a brushless 48 Volts motor manufactured by MCG, Inc. of Eden Prairie, Minn.

The amplifier 518 is electrically coupled to the motor 516. The amplifier 516 is configured to receive programmed inputs from an operator or stored program regarding the cartridge door testing parameters (e.g., desired door open angles). The amplifier 518 outputs appropriate servo signals to the motor 516. As an example, the amplifier 518 can be a PWM servo amplifier manufactured by Advanced Motion Controls of Camarillo, Calif.

As shown in a top view of the system 500 in FIG. 6, the pivot or actuation point associated with each of the interface 506, lever 508, torque sensor apparatus 514, and motor 516 is along the rotational axis 600 of the cartridge door, such as the cartridge door 214 in FIG. 4. Hence it is contemplated that when tape cartridges have differently located rotation axes, the system 500 can be adjusted to realign the components along different rotation axes.

It is understood that the system 500 includes various connectors, support brackets, etc. to couple and/or position the components relative to each other. For example, the tape cartridge holder 504 can include a cartridge casing abutment portion and a tension portion to securely hold the tape cartridge there between. The interface 506 can include a counter weight to balance the load to the interface 506 caused by the cartridge door during door operation.

The motor 516 is configured to cause opening of the cartridge door 214 to a desired position, and the corresponding amount of torque is measured by the torque sensor apparatus 514. Continuous or discrete torque measurements over a range of open positions are possible via control of the motor 516. The motor 516 can be programmed to open the cartridge door at one or more desired positions. The torque measurements are provided in real-time or approximately in real-time. These torque measurements can be readout via a digital meter (or gauge), stored in a database (or spreadsheet), and/or analyzed. In any case, because the torque measurements are relative to the same points of reference (e.g., a constant perpendicular distance from the door hinge pivot point and the force in the perpendicular direction only), the obtained data are immediately usable and meaningful. There is no need to convert or deconstruct the measured data to actually obtain torque measurements (e.g., conversion of force measurements into torque measurements).

The system 200 or 500 may be configured to measure torque from a closed (or almost closed) door position to one or more open door positions. Alternatively, the system 200 or 500 may be configured to measure torque from a first open door position to a second open door position. The first open door position may have a smaller or larger door angle than the second open door position.

In this manner, tape cartridges are tested for manufacturing consistency, operability, and/or compatibility with tape cartridge handling devices. The torque required to open the tape cartridge door at one or more open positions is directly measured. The interface 206 of the system 200 can be indexed (or otherwise notated) to indicate when the cartridge door has been opened to desired test position(s). This may be useful when it is desired to test torque at particular door angles for every cartridge, e.g., half way open and fully open positions. For the interface 506 of the system 500, the motor 516 can be programmed to test torque at particular door angles for every cartridge. Hence, test or measurement uniformity and repeatability is possible across many tape cartridges.

The testing scheme can also be fully automated such that tape cartridges can be loaded, tested, removed, and/or torque measurements stored or analyzed without operator assistance. For example, the system 200 or 500 may be implemented with a robotic arm or assembly line scheme where random or every tape cartridge is tested prior to packaging. Because torque measurement is the direct output and is practically provided in real-time in the systems 200 and 500, the cartridge door torque check can quickly determine if a given tape cartridge meets quality control during the manufacturing process.

In alternative embodiments of the system 200 or 500, torque associated with devices other than tape cartridges may be tested. The alternate device could be a drive device that includes a pivoting door. As another example, the alternate device may be a drive bezel containing a pivoting door. The alternate device could also be a tape cassette having a pivoting door, such as those including a single reel or dual reels. The alternate device may also be a magnetic or optical recording medium, other storage mediums, or data storage recording or readout devices. Collectively, devices or mediums that may be tested using the system 200 or 500 are referred to as media devices.

The tape cartridge holder 204 (or 504) and/or the lever 208 (or 508) can be modified to position the rest of the system for direct torque measurements of devices other than tape cartridges. For example, the rotating arm 500 may be shortened or lengthened to achieve the desired distance between the door pivot axis and contact point. As another example, the contact pin may comprise an "L" shaped contact pin and contact the door perpendicular to the major plane of the door when the door pivots inwardly into the media device.

From the foregoing, it will be appreciated that specific embodiments of the invention have been described herein for purposes of illustration, but that various modifications may be made without deviating from the spirit and scope of the invention. For example, although a certain type of tape cartridge may be discussed herein, other types of tape cartridges or media devices may be tested. Accordingly, the invention is not limited except as by the appended claims.

What is claimed is:

1. A method for measuring operating torque of a media device, the method comprising:
    rotating a door of the media device to at least one angle using an actuator applying force at a contact point on the door, wherein a distance from a rotational axis of the door to the contact point is constant over a range of angles of the door and the force is applied in a direction perpendicular to a major plane of the door; and
    sensing torque associated with the door for the at least one angle, wherein a rotational axis of the actuator is coaxial with the rotational axis of the door, wherein the actuator comprises a rotating arm and a contact element, the contact element in contact with the door at the contact point, a first end of the rotating arm connected to the contact element, and a second end of the rotating arm extending to and pivoting about the rotational axis of the actuator and excluding a member parallel to the rotational axis of the actuator.

2. The method of claim 1, wherein the actuator includes a door operating lever.

3. The method of claim 2, wherein sensing includes sensing torque representative of an amount of torque applied to the door by the lever.

4. The method of claim 1, wherein rotating a door includes manually rotating the door.

5. The method of claim 1, wherein rotating a door includes electromechanically rotating the door.

6. The method of claim 1, wherein the door is at least one of a tape cartridge door, a tape cassette door, a storage medium door, a drive bezel door, and a media drive device door.

7. A system for measuring torque of a media device door, the system comprising:
an actuator configured to contact the media device door at a contact point, wherein a distance from a rotational axis of the media device door to the contact point is constant over a range of angles of the media device door; and
a torque sensor configured to measure force applied to the media device door by the actuator in a direction perpendicular to a major plane of the media device door at the contact point, wherein the torque sensor is coupled to the actuator and a rotational axis of each of the actuator and the torque sensor is coaxial to the rotational axis of the media device door.

8. The system of claim 7, wherein the actuator includes a door operating lever, the door operating lever in contact with the media device door at the contact point.

9. The system of claim 8, wherein the door operating lever includes a rotating arm and a contact pin.

10. The system of claim 7, wherein the actuator includes a torque transducer.

11. The system of claim 7, wherein the actuator includes a torque transducer and a lever, the lever in contact with the media device door at the contact point and a rotational axis of the lever is coaxial with the rotational axis of the media device door.

12. The system of claim 11, further comprising:
an interface coupled between the lever and the torque transducer, wherein a pivot point of the interface is coaxial to the rotational axis of the media device door.

13. The system of claim 7, further comprising:
a motor coupled to the actuator and positioned along the rotational axis of the media device door.

14. The system of claim 13, wherein the motor is a brushless servo-motor.

15. The system of claim 7, further comprising:
a media device holder and positioner for maintaining the media device relative to the actuator over the range of angles of the media device door.

16. The system of claim 7, wherein the range of angles of the media device door is in the range of approximately 0 degrees to 115 degrees.

17. The system of claim 7, wherein to actuator applies the force in a direction away from a closed door position.

18. The system of claim 7, wherein the media device door is a tape cartridge door.

19. The system of claim 7, wherein the media device door is a tape cassette door.

20. The system of claim 7, wherein the media device door is a door of a drive bezel.

21. The system of claim 7, wherein the media device door is a door of at least one of a storage device, magnetic recording medium, optical recording medium, and storage device drive.

22. A system for measuring torque of a media device door, the system comprising:
an actuator configured to contact the media device door at a contact point, wherein a distance from a rotational axis of the media device door to the contact point is constant over a range of angles of the media device door, a rotational axis of the actuator is coaxial to the rotational axis of the media device door, and wherein the actuator comprises a rotating arm and a contact element, the contact element in contact with the door at the contact point, a first end of the rotating arm connected to the contact element, and a second end of the rotating arm extending to and pivoting about the rotational axis of the actuator and excluding a member parallel to the rotational axis of the actuator; and
a torque sensor configured to measure force applied to the media device door by the actuator in a direction perpendicular to a major plane of the media device door at the contact point to an open position.

* * * * *